United States Patent
Sen et al.

(10) Patent No.: US 12,050,877 B2
(45) Date of Patent: Jul. 30, 2024

(54) CONTEXTUAL DIALOGUE FRAMEWORK OVER DYNAMIC TABLES

(71) Applicant: International Business Machines Corporation, Armonk, NY (US)

(72) Inventors: Jaydeep Sen, Bangalore (IN); Samarth Bharadwaj, Bangalore (IN); Saneem Ahmed Chemmengath, Bangalore (IN); Vishwajeet Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 17/543,257

(22) Filed: Dec. 6, 2021

(65) Prior Publication Data

US 2023/0177277 A1 Jun. 8, 2023

(51) Int. Cl.
  *G06F 40/40* (2020.01)
  *G06F 16/901* (2019.01)
  *G06F 40/205* (2020.01)

(52) U.S. Cl.
  CPC ............ *G06F 40/40* (2020.01); *G06F 16/902* (2019.01); *G06F 40/205* (2020.01)

(58) Field of Classification Search
  CPC ....... G06F 40/40; G06F 16/902; G06F 40/205
  See application file for complete search history.

(56) References Cited

U.S. PATENT DOCUMENTS

| 10,180,964 B1 | 1/2019 | Baker et al. |
| 2016/0306852 A1 | 10/2016 | Guggilla et al. |
| 2019/0012373 A1 | 1/2019 | Malik et al. |
| 2019/0228068 A1 | 7/2019 | Sen et al. |
| 2020/0034362 A1 | 1/2020 | Galitsky |
| 2020/0301913 A1* | 9/2020 | Lai ........................ G06F 16/243 |
| 2021/0150152 A1 | 5/2021 | Galitsky |
| 2021/0306287 A1 | 9/2021 | Sundaravadivel et al. |

(Continued)

FOREIGN PATENT DOCUMENTS

CN  110070862 A  7/2019

OTHER PUBLICATIONS

Brownlee, Jason, "A Gentle Introduction to the Rectified Linear Unit (ReLU)", retrieved from https://machinelearningmastery.com/rectified-linear-activation-function-for-deep-learning-neural-networks/, published on Aug. 20, 2020. (Year: 2020).*

(Continued)

*Primary Examiner* — Brian L Albertalli
(74) *Attorney, Agent, or Firm* — Ryan, Mason & Lewis, LLP (57) ABSTRACT

Methods, systems, and computer program products for providing a contextual dialogue framework over dynamic tables are provided herein. A computer-implemented method includes maintaining a context space for a natural language conversation of a user, wherein the context space comprises a dynamic set of one or more tables used for processing at least one query of the natural language conversation; obtaining an additional table associated with an additional query of the natural language conversation; discovering one or more implicit links between the additional table and the dynamic set of tables; updating the context space with the one or more implicit links; and answering the additional query based at least in part on the updated context space.

20 Claims, 9 Drawing Sheets

(56) References Cited

U.S. PATENT DOCUMENTS

| | | | |
|---|---|---|---|
| 2022/0004547 A1* | 1/2022 | Lin | G06F 16/35 |
| 2022/0044134 A1* | 2/2022 | Joy | G06N 3/045 |
| 2022/0129448 A1* | 4/2022 | He | G06F 16/2237 |
| 2022/0309087 A1* | 9/2022 | Müller | G06F 40/143 |
| 2023/0018489 A1* | 1/2023 | Jiang | G06F 16/212 |
| 2023/0134933 A1* | 5/2023 | Lee | G06N 3/08 706/45 |

OTHER PUBLICATIONS

Mell, Peter, et al., The NIST Definition of Cloud Computing, National Institute of Standards and Technology, U.S. Department of Commerce, NIST Special Publication 800-145, Sep. 2011.

Krishnamurthy, Jayant, et al., Neural semantic parsing with type constraints for semi-structured tables, Proceedings of the 2017 Conference on Empirical Methods in Natural Language Processing, Sep. 2017, pp. 1516-1526.

Chen, Hongshen, et al., A survey on dialogue systems: Recent advances and new frontiers. Acm Sigkdd Explorations Newsletter 19, No. 2, Nov. 2017, pp. 25-35.

Yin, Pengcheng, et al., TaBERT: Pretraining for joint understanding of textual and tabular data, arXiv preprint arXiv:2005.08314, May 17, 2020.

Liang, Chen, et al. "Memory augmented policy optimization for program synthesis and semantic parsing." arXiv preprint arXiv:1807.02322, Jul. 2018.

Herzig, Jonathan, et al., Tapas: Weakly supervised table parsing via pre-training, arXiv preprint arXiv:2004.02349, Apr. 2020.

Vakulenko, Svitlana, et al., Tableqa: Question answering on tabular data, arXiv preprint arXiv:1705.06504, May 18, 2017.

Using More Than one Table, MySQL Tutorial, Section 4.4.9, available at "https://dev.mysql.com/doc/mysql-tutorial-excerpt/8.0/en/multiple-tables.html", last accessed Dec. 6, 2021.

Access—Designing a Multi-table Query, available at https://edu.gcfglobal.org/en/access/designing-a-multitable-query/1/, last accessed Dec. 6, 2021.

Cho, Minseok, et al., Adversarial tableqa: Attention supervision for question answering on tables, Asian Conference on Machine Learning. PMLR, Nov. 4, 2018.

Ramesh, Gowtham, AI-enabled conversations with Analytics tables, available at https://towardsdatascience.com/ai-enabled-conversations-with-analytics-tables-66a10c9a3d05, Nov. 2, 2020.

International Search Report and Written Opinion from International Application No. PCT/CN2022/134544, 8 pages, mailed Feb. 21, 2023.

* cited by examiner

CONTEXTUAL DIALOGUE FRAMEWORK OVER DYNAMIC TABLES

BACKGROUND

The present application generally relates to information technology and, more particularly, to natural language (NL) processing.

Question and answer systems include systems configured to process NL queries over tabular data. Generally, given a table and a NL question, such systems find an answer to the NL question from the table. TableQA is one example of such a system that allows NL queries on tabular data.

SUMMARY

In one embodiment of the present disclosure, a contextual dialogue framework over dynamic tables is provided. An exemplary computer-implemented method includes maintaining a context space for a natural language conversation of a user, wherein the context space comprises a dynamic set of one or more tables used for processing at least one query of the natural language conversation; obtaining an additional table associated with an additional query of the natural language conversation; discovering one or more implicit links between the additional table and the dynamic set of tables; updating the context space with the one or more implicit links; and answering the additional query based at least in part on the updated context space.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Question and answer systems include systems configured to process NL queries over tabular data. Generally, given a table and a NL question, such systems find an answer to the NL question from the table. TableQA is an example of one such system, and its work can be categorized into two groups, intermediate forms (referred to as logical forms (LFs)) and cell(s) prediction. Typically, LFs may be represented in different forms, including, Lambda Calculus, Lambda DC, QDMR, and SQL. The task of TableQA is a machine translation problem for a NL LF and an execution of LF over a table. For cell(s) prediction, the problem is to train end-to-end neural models that can predict the correct cell(s) of a table to answer an NL query over a table. One approach includes predicting the row and column separately and then considering the intersection to produce the answer.

Existing dialog systems over databases need an explicit model of the database schema with predefined JOIN operations. Such systems often require substantial amounts of auxiliary data to model the conversation flow (e.g., intents, transition between intents, and/or action per intent match). Additionally, existing techniques often require users to submit all of the data (e.g., schema) at once. Such techniques often operate on predefined schema and maintain conversation context in a similar manner as a state machine. For example, each state may represent a subset of tables from the complete schema, where the same context model cannot scale to situations where one or more new tables are added. Accordingly, at least one disadvantage of existing techniques is that, for every new database and/or table, a user needs to re-model the conversation workspace to align with the new database and/or table.

Exemplary embodiments described herein can perform question answering on tables by leveraging semantic parsing models (e.g., in TableQA) with limited amounts of table specific training or modeling. Additionally, in some embodiments, a conversational interface allows users to dynamically add one or more new tables such that question answering can be performed across previous and the newly added tables without needing to remodel the conversational workspace. The conversational interface also enables users to gradually use or expose only the portions of data that are required at particular steps without needing to remodel the conversational workspace. Some embodiments include managing dialog context where a table is interpreted as a quantum of CRUD (create, read, update, and delete) operations in a context space.

Figure 1:
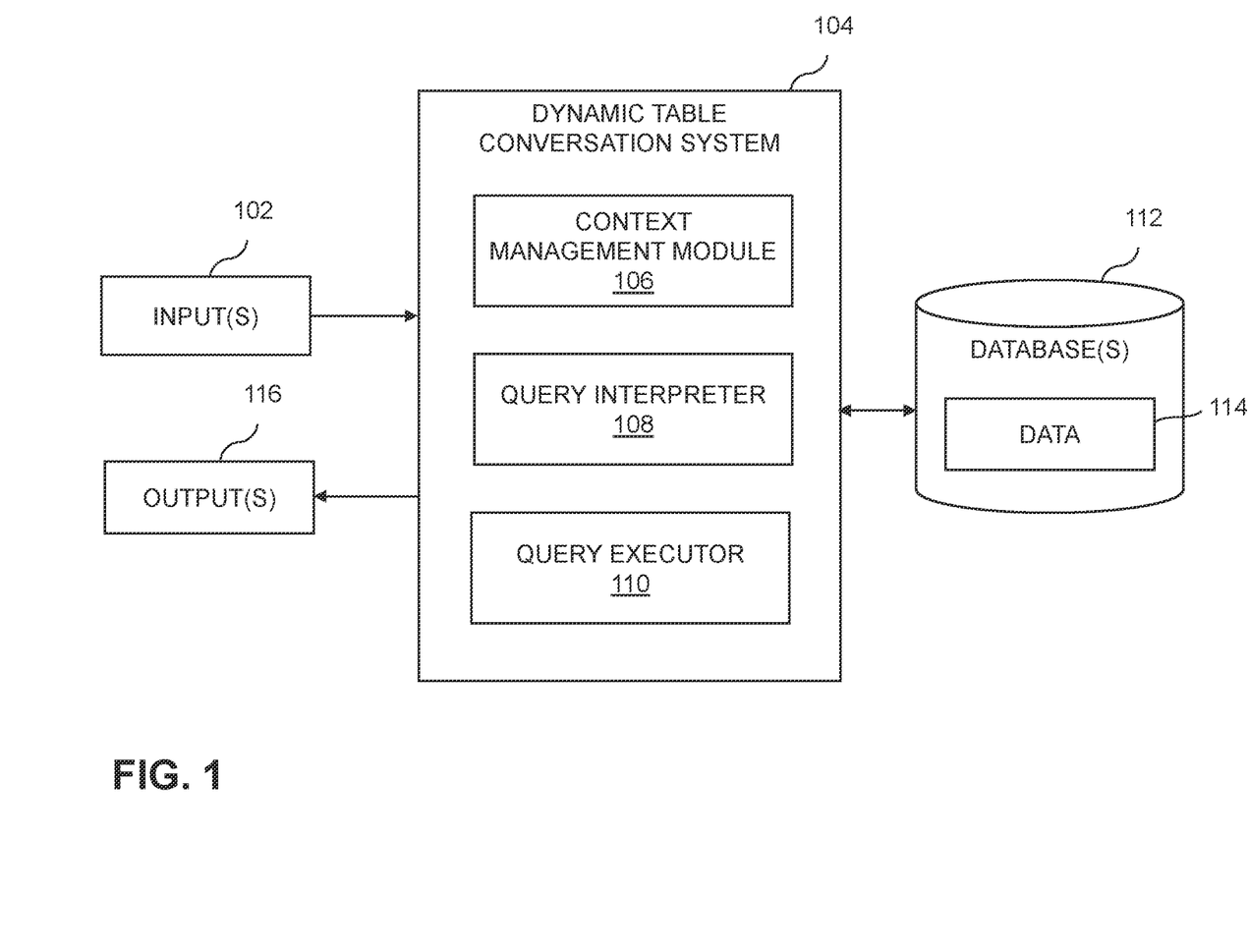
FIG. 1 is a diagram illustrating a system architecture in accordance with exemplary embodiments.

FIG. 1 is a diagram illustrating a system architecture in accordance with exemplary embodiments. By way of illustration, FIG. 1 depicts a dynamic table conversation system 104, that includes a context management module 106, a query interpreter 108, and a query executor 110. The dynamic table conversation system 104 is also associated with one or more databases 112 comprising data 114 pertaining to, for example, a context space, one or more answers, and one or more meaning representations (MRs). The context space can include one or more tables and one or more links between the tables, for example.

In the FIG. 1 example the dynamic table conversation system 104 can obtain one or more inputs 102. In some embodiments, the inputs 102 may include one or more user tables, such as tables in a digital format. The inputs 102 may also include one or more user questions.

Generally, the context management module 106 manages a context space within the one or more databases 112 using CRUD operations. For example, given a new question q, and a new table T, the context manager can determine how to manage the new table T in the existing context space. For example, the context management module 106 can:

- determine the context needs a full refresh with T, in which case a delete operation on the previous context is performed and a create operation is performed for the context only on T;
- determine the context needs an update using T, in which case an update operation is performed on the previous context;
- determine the context does not need to be changed, in which case a read operation is performed on the on previous context.

The context management module 106 can determine the context of the question (e.g., whether the context of the question relies only on T, or if one or more previous tables are needed), and which tables are to be used to answer q.

Alternatively, or additionally, the context management module 106 can determine a table schema to retrieve missing information (such as columns that capture the missing information and/or reference entities in the existing context that can link to the missing information, for example).

Generally, the query interpreter 108 obtains meaning representations of queries associated with the inputs 102. The meaning representations, in some embodiments, are stored in the one or more databases 112. The meaning representations may also be used by the query executor 110 to execute a target query on the data 114 to obtain an answer to a question.

In some embodiments, the one or more outputs 116 of the dynamic table conversation system 104 may include an answer to one or more questions that were provided as inputs 102. Alternatively, or additionally, the one or more outputs 116 can include one or more recommended schema for one or more new tables that were provide as inputs 102. Further details of the dynamic table conversation system 104 and its components are described in more detail elsewhere herein.

At least some embodiments described herein can be applied in situations where a new table is provided by a user. For example, a user may not know which tables are required for questions the user wants to ask. A new table may be provided with information that is contextual in nature, such as user specific information (e.g., private information) or information from multiple different sources (e.g., one or more search engines or interfaces). In this situation the source tables are evolving, and the user has access to a specific instance. For example, stock market information can be obtained from search engines such that new tables are updated incrementally.

One or more embodiments described herein provide assisted table retrieval. In at least one embodiment, explicit join feedback is provided, for example, during a machine-human dialog, where the user asks a question that cannot be answered using existing tables. Such embodiments can include prompting the user about any missing information and/or any expected table schema. In at least some embodiments, new tables are retrieved for answering a user's question based at least in part on the expected table schema.

Figure 2:
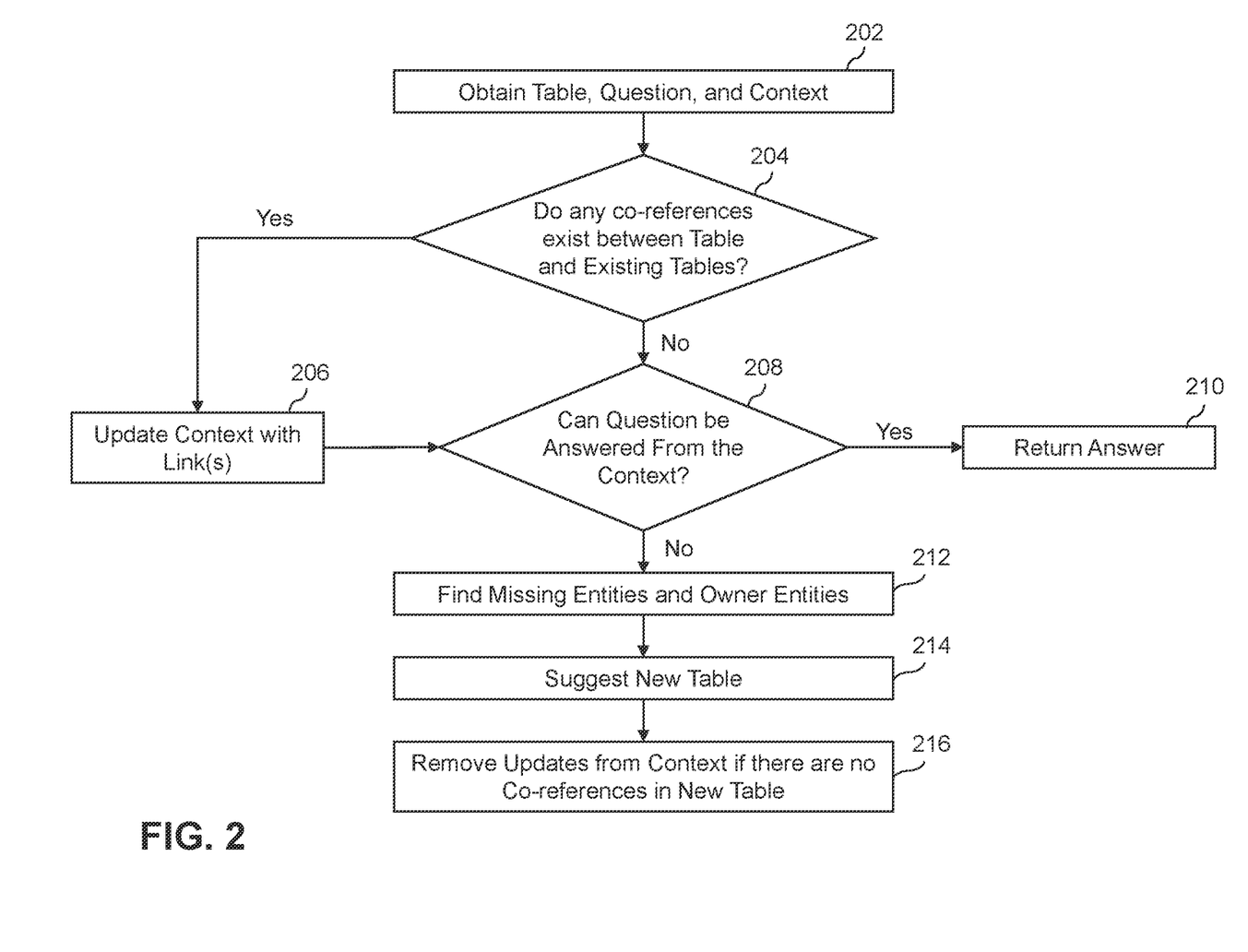
FIG. 2 is a process flow diagram in accordance with exemplary embodiments.

Referring now to FIG. 2, this figure shows a high-level process flow diagram in accordance with illustrative embodiments. Step 202 includes obtaining a table, T, a question, and a context. For example, the context can be stored in the one or more database(s) 112 in the form of a context graph and can include information pertaining to links between existing tables. Step 204 includes a test to determine if any co-references (e.g., links) exist between existing tables in the context. If yes, then step 206 includes updating the context with the links from step 204, and the process continues to step 208. If there are no co-references at step 204, then the process continues directly to step 208. Step 208 includes a test to determine whether the question can be answered from the current context. If yes, then step 210 returns an answer to the question. If no, then the step 212 includes finding entities and corresponding owner entities that are missing from the context graph. Step 214 includes suggesting a new table based on, for example, a schema determined from the missing information from step 212. If there are no co-references in the new table, then step 216 includes removing the updates that were added to the context.

As another example, consider a table T, question Q, and context G are given as inputs. An example of an algorithm for obtaining an updated context G' and outputting at least one of: an answer A, and a suggested table, is as follows:

```
1:   G' = G' + {T}
2:   If (∃ T2 ε G | (T,T2) has co-reference)
3:     G' = G' + find_coref_link(T2,T)
4:   find_matches(Q on G')
5:     If (Q answerable over G')
6:       Return Answer(Q,G')
7:     Else
8:       missingEntities = find_unmatched_entities(Q,G')
9:       Entity ownerEntity = findRefEntityFromContext(missingEntity, G')
10:      Table suggestedT = prepareTableSchema(ownerEntity + missingEntities)
11:      Suggest retrieving Table suggestedT
12:  If(∄ co-ref(T,G) && suggestedT ∩ G = ∅)
13:    G'= {T}
14:  Update G = G'
```

Generally, the task of the find_coref_link function in line 2 of the above algorithm is to find co-references between table columns and/or entities. By way of example, consider a table T2 having a column C1, that includes names of Nobel Prize Laureates and another table T1 having a column C1 that includes names of Scientists, such that:

T2.C1: Nobel Laureate Name→(Name 1, Name 2, . . . )

Scientist Name→(Name 3, Name 2, . . . )

Thus, the task is to detect that T1.C1 co-refers to T2.C1, as they both reference "Name 2". In at least one embodiment, a rule-based process includes looking up column values in an online database resource (e.g., Freebase or DBPedia), to determine if column values share a common class or are siblings. If so, then T1.C1 co-refers to T2.C1. Such a process can also include looking up column names in a lexical database of semantic relations (e.g., WordNet). If one of the column names is an ancestor of the other in the lexical database, then the column names are considered co-references. Additionally, one or more heuristics can be applied to the path in the lexical database to their lowest common ancestor. Non-limiting examples of heuristics include comparing the length of the path to a threshold and comparing the size of a subtree rooted at a Least Common Subsumer (LCS) against a threshold. Accordingly, in the example above, it can be determined that T1 co-refers to T2 if the column names "Scientist" and "Nobel Laureate" are siblings of a common class "Person" in a lexical database.

Figure 3:
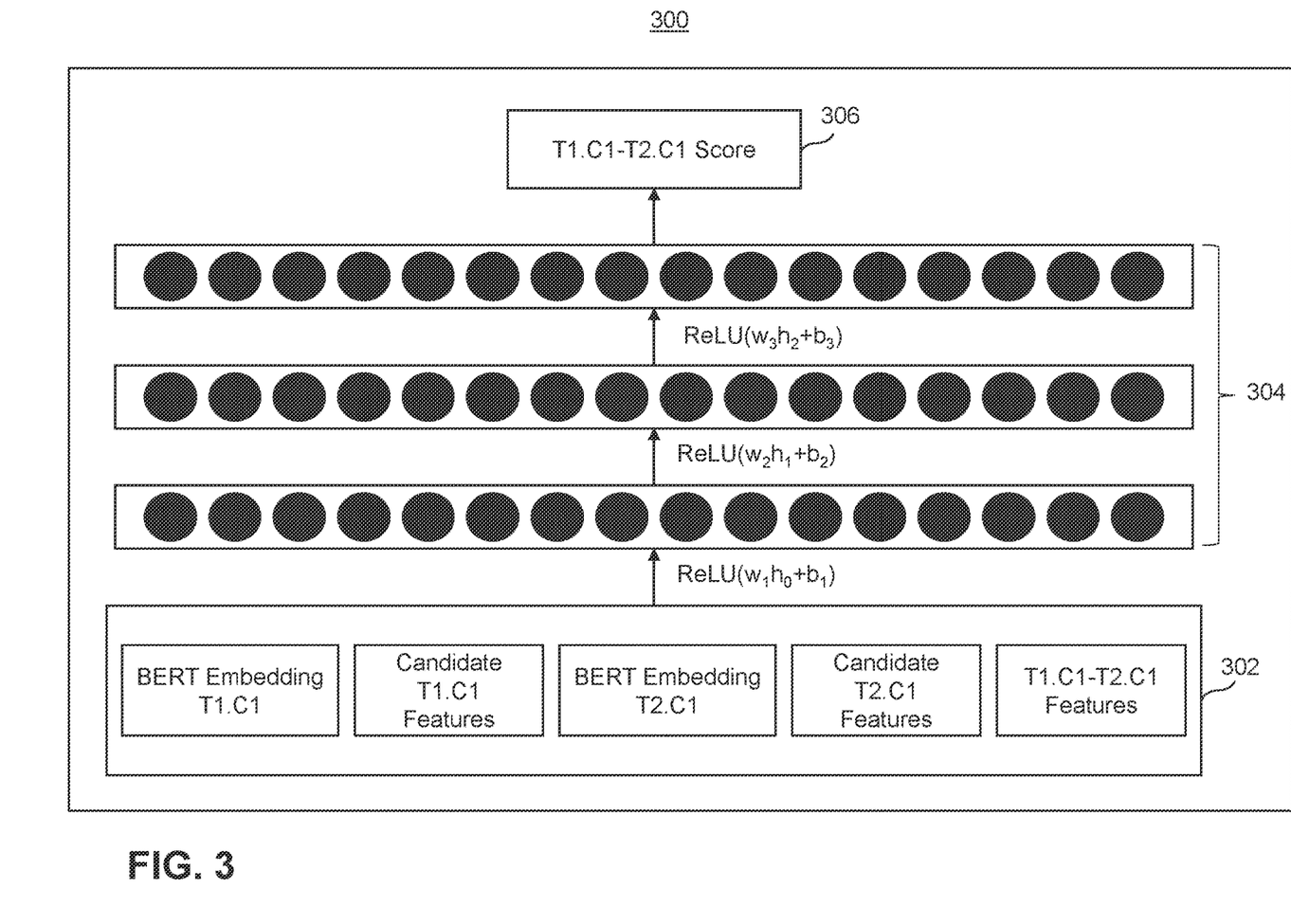
FIG. 3 is an example of a data table in accordance with exemplary embodiments.

Also, the co-references between table columns and/or entities may be found using a machine learning-based approach. FIG. 3 shows a representation of at least a portion of machine learning framework 300 for finding co-references between table columns and/or entities in accordance with at least some embodiments. In this example, the machine learning framework 300 includes an input layer 302, hidden layers 304, and an output score 306. More specifically, the input layer may include Bidirectional Encoder Representations from Transformer (BERT) embedding for T1.C1, candidate T1.C1 features, a BERT embedding for T2.C1, candidate T2.C1 features, and T1.C1-T2.C1 features. It is noted that T1.C1-T2.C1 represents a possible distant metric to compute the similarity between the embedding for T1.C1 and T2.C1. In this example, T1.C1-T2.C1 is used as a feature for the hidden layers 304. The hidden layers 304 include Rectified Linear Units (ReLUs) that process the inputs to determine a similarity score. If the score is above a certain threshold, then the process can determine that the tables co-refer. It is noted that the machine learning framework 300 shown in FIG. 3 is not intended to be limiting, and other frameworks and techniques are also possible such as a dynamic neural network framework or a post-processing rule-based system to determine similarity.

One or more embodiments include finding a reference entity for a new entity, such as a word. For example, assume a user provides the following query Q: "Show all the Nobel laureates from countries in 'Continent A' over the last 5 years,", and also assume that T1 includes the following columns {Scientist Name, Curing Disease, Year} and T2 includes the following columns {Nobel Laureate Name, Branch, Year}. In this example, the missing entities are "Continent A" and "Country," and thus the task is to detect that T1.Scientist Name or T2.Nobel Laureate Name is a reference entity for Country and Continent.

According to one embodiment, a rule-based approach includes performing the following for each candidate column C: (i) look up entities corresponding to the column values in one or more database tools (e.g., Freebase or DBPedia); (ii) collect the neighborhood entities from the KG; and (iii) classify neighborhood entities to top K classes. If the top K classes include the missing entity class; then C is a possible reference entity column for the missing entity.

According to yet another embodiment, a machine-learning based approach may be performed to find a reference entity for a new entity input by the user. For example, the machine learning based approach may include generating a training dataset based on a plurality of table schemas and queries (e.g., SQL queries), performed over the table schemas. The training dataset may include input data. An example of an input from the training dataset can include: (1) a set of column names of a base table and (2) a set of missing entities (e.g., column names and cell values from SQL queries). The output training dataset may include output data corresponding to the input data. An example of an output from the training dataset can include: a column name from a base table which is the common column between the base table and target table, which includes missing entities. The training dataset is then used to train a set transformer. The set transformer can correspond to an attention-based permutation-invariant neural networks, for example.

Figure 4:
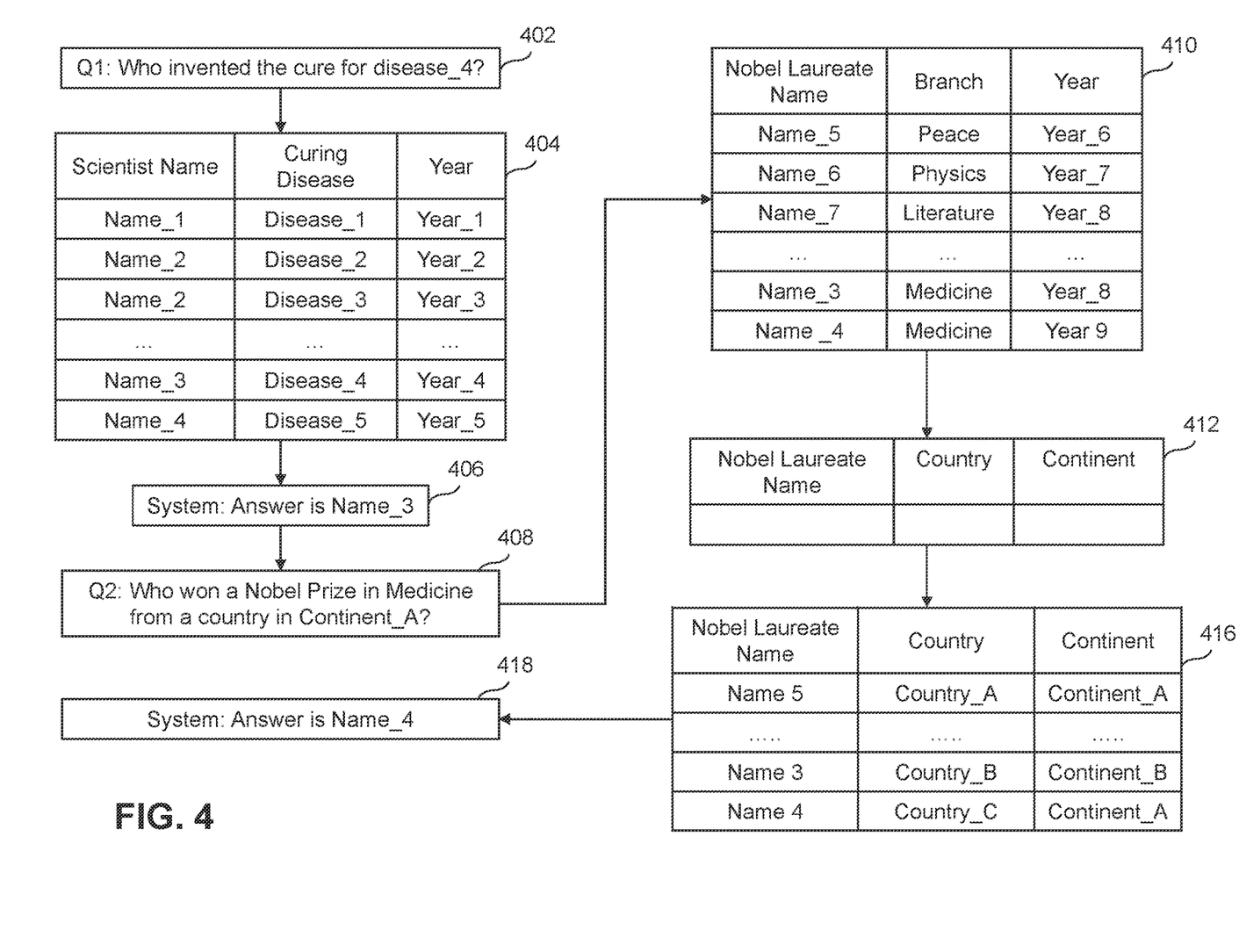
FIG. 4 shows an example of interaction between a question and answering system and a user in accordance with exemplary embodiments.

FIG. 4 shows an example of interaction between a question and answering system and a user in accordance with exemplary embodiments. Initially, a user asks a first question Q1 as shown at block 402. The system retrieves table 404 to provide an answer 406. The user then asks a second question (Q2), namely, "Who won a Nobel Prize in Medicine from a country in continent_A?", as shown at block 408. In response to the question at block 408, the system performs a context update, which includes adding table 410 to the context, and adding a co-reference link between the column name "Scientist Name" of table 404 and the column name "Nobel Laureate Name" in table 410. The system also determines that the missing entities include "Country" and "Continent" based on the question at block 408, and identifies the reference entity as "Nobel Laureate Name" based on the context. The system generates a candidate table schema 412 for answering the question at block 408 using the missing entities and the determined reference entity. The system builds table 416 according to the candidate table schema 412 and uses the table 416 to provide an answer 418 to the question at block 408.

Figure 5:
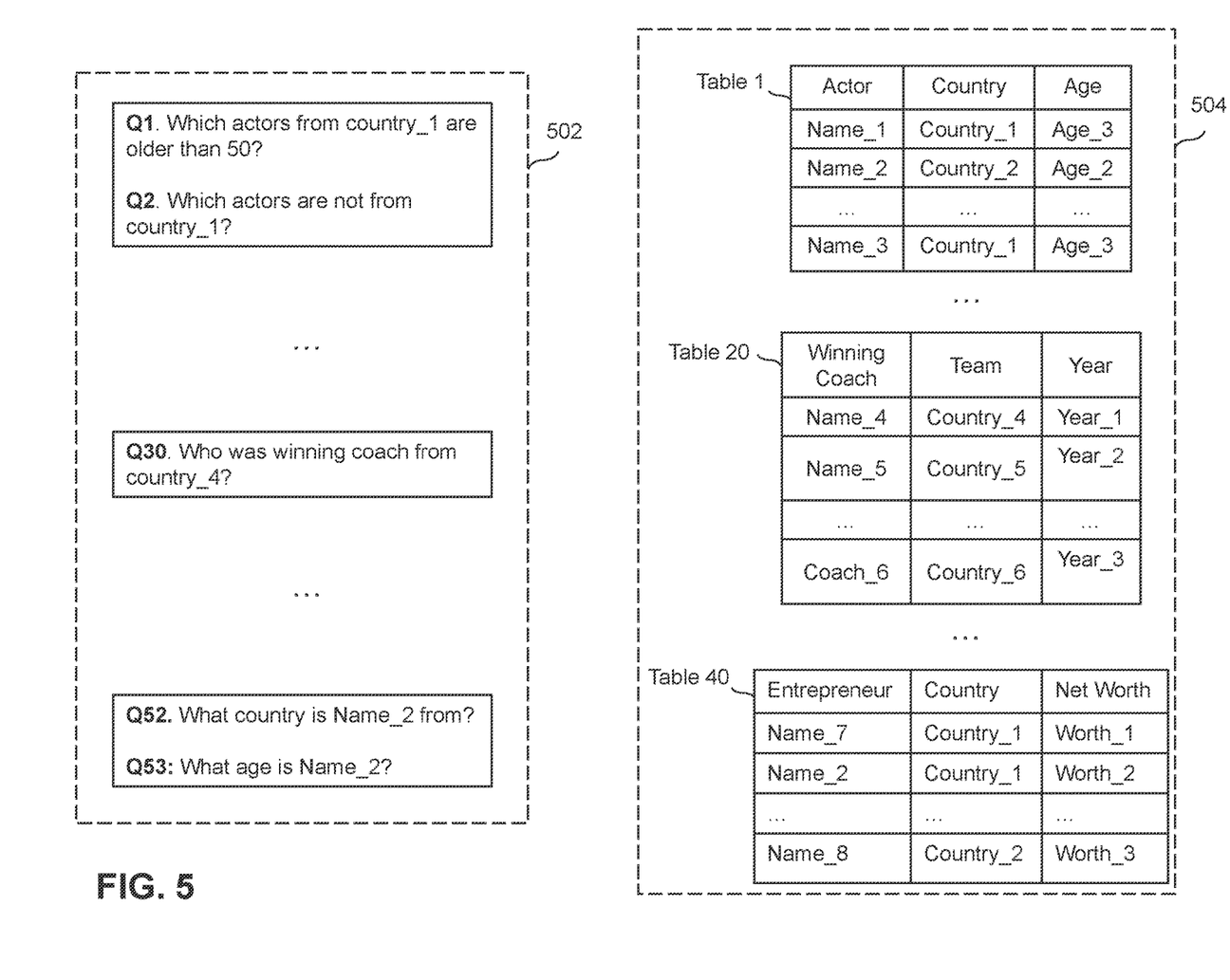
FIG. 5 is a diagram illustrating a series of questions and corresponding tables in accordance with exemplary embodiments.

FIG. 5 shows a series of questions 502 and corresponding tables 504 in accordance with exemplary embodiments. In this example, the tables 504 include table 1 through table 40. It is assumed that table 1 is used to answer questions Q1 and Q2, table 20 is used to answer question Q30, and table 40 is used to answer questions Q52 and Q53. Assume an entity linking process is performed that discovers implicit links between the table columns of table 1 through table 40, and all of the tables and their respective links are kept in a context graph. For example, such an approach can result in an ambiguity between the actor in table 1 with name_2 and the entrepreneur in table 40 with name_2 (assuming these are different people with the same name), and incorrect interpretations (e.g., the answer for question Q53 is provided from Table 1). The context management techniques described herein allow the system to use the proper table (i.e., table 40) for question Q52 and allows the system to request a new table for question Q53 with the following column names: entrepreneur and age.

Accordingly, some embodiments described herein discover implicit links between tables and/or a reference entity that is used to suggest a table schema for missing information in a contextual dialogue framework. The implicit links may be identified between an existing column (e.g., T1.C1) and a new column (e.g., T2.C2) without any guarantee that T1.C1⊆T2.C2 (or vice versa), and even when vague column names are used that do not necessarily represent the column values.

Figure 6:
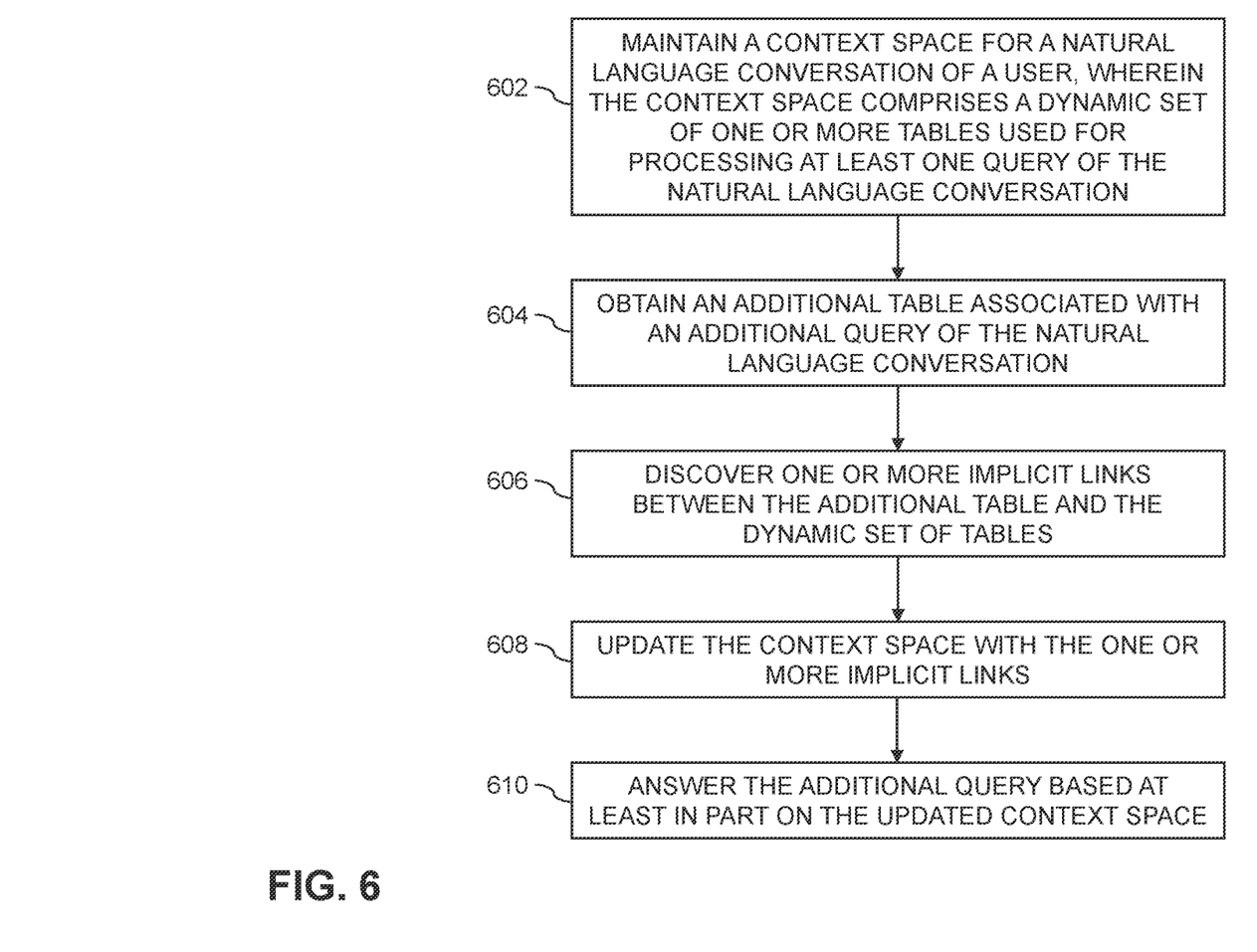
FIG. 6 is a flow diagram illustrating techniques for providing a contextual dialogue framework over dynamic tables in accordance with exemplary embodiments.

FIG. 6 is a flow diagram illustrating techniques for providing a contextual dialogue framework over dynamic tables in accordance with exemplary embodiments. Step 602 includes maintaining a context space for a natural language conversation of a user, wherein the context space comprises a dynamic set of one or more tables used for processing at least one query of the natural language conversation. Step 604 includes obtaining an additional table associated with an additional query of the natural language conversation. Step 606 includes discovering one or more implicit links between the additional table and the dynamic set of tables. Step 608 includes updating the context space with the one or more implicit links. Step 610 includes answering the additional query based at least in part on the updated context space.

The process may include the following steps: in response to determining that the additional query cannot be answered using the updated context space, identifying at least one entity in the additional query that does not match information maintained in the context space; determining a reference entity for the at least one entity in the additional query; and generating a new table schema for answering the one additional query based at least in part on the at least one missing entity and the reference entity. The process may include generating a new table with the new table schema; and answering the additional query based at least in part on the new table. Determining the reference entity may include: identifying one or more candidate columns in the dynamic set of tables related to the at least one entity; searching at least one external knowledge base of structured data to identify one or more classes of entities corresponding to values in each of the one or more candidate columns; and selecting one of the candidate columns as the reference entity based at least in part on a comparison of the identified one or more classes and the at least one entity. Determining the reference entity may include identifying the reference entity based at least in part on a neural network trained on a plurality of historical table schemas and a plurality of historical queries. The neural network may include an attention-based permutation-invariant neural network. Discovering the one or more implicit links between the additional table and the dynamic set of tables may include: determining a similarity score between columns of the additional table and columns of the dynamic set of tables based at least in part on one or more machine learning models. The one or more machine learning models may include at least one of: a bidirectional encoder representations from transformer module; and one or more rectified linear unit layers. Discovering the one or more implicit links between the additional table and the dynamic set of tables may include: searching at least one external knowledge base of structured data to identify common entities of (i) at least one value in a column of the additional table and (ii) at least one value in a column of the dynamic set of tables. Discovering the one or more implicit links between the additional table and the dynamic set of tables may include: searching at least a lexical database of semantic relations to identify common column names of (i) at least one column of the additional table and (ii) at least one column of the dynamic set of tables.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 7:
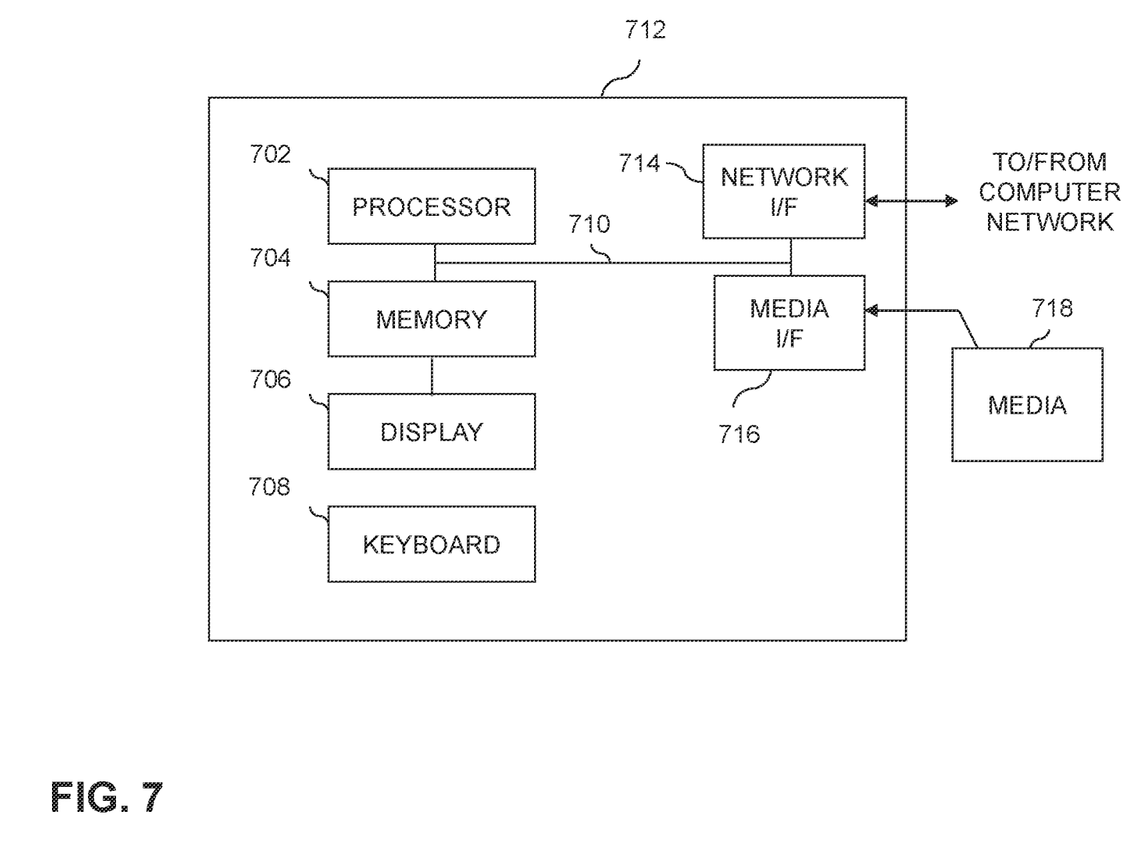
FIG. 7 is a system diagram of an exemplary computer system on which at least one embodiment of the present disclosure can be implemented.

Additionally, an embodiment of the present disclosure can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
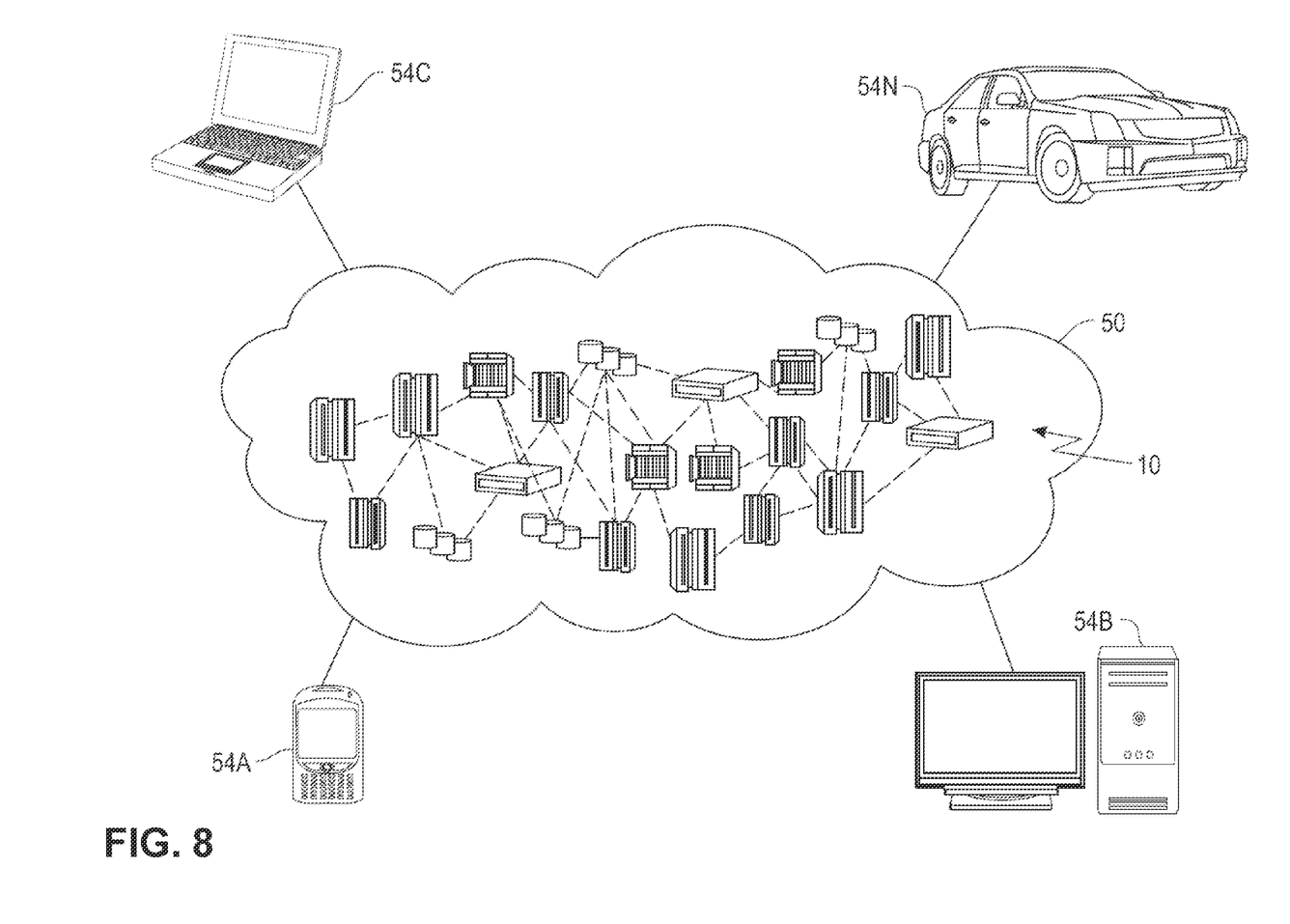
FIG. 8 depicts a cloud computing environment in accordance with exemplary embodiments.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
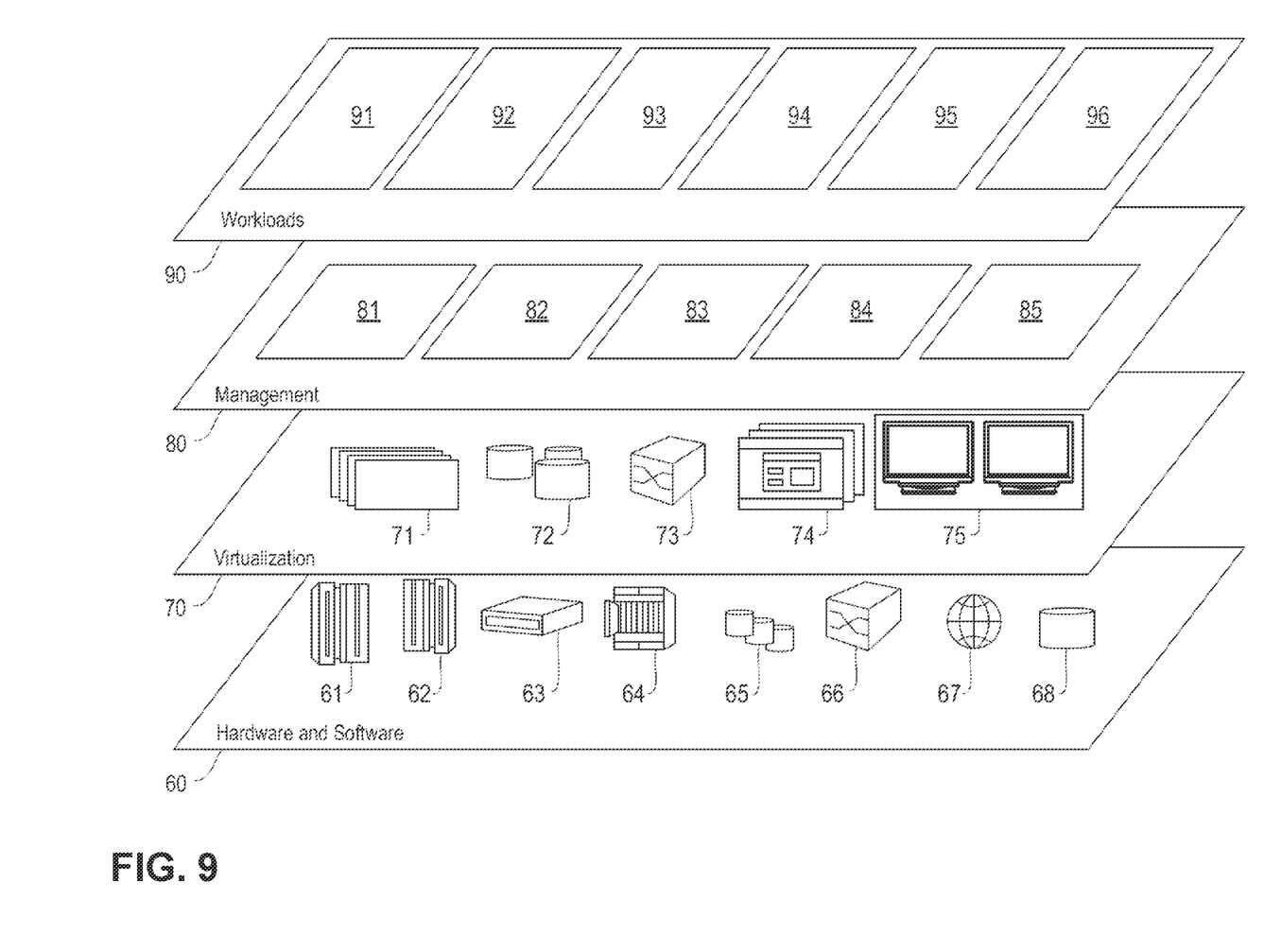
FIG. 9 depicts abstraction model layers in accordance with exemplary embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and NL-query processing over dynamic tables 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The exemplary embodiments of the present disclosure may provide one or more beneficial effects such as, for example, performing question answering on tables by leveraging semantic parsing models (e.g., in TableQA) with limited amounts of table specific training or modeling relative to existing techniques, providing a conversational interface that enables users to dynamically add one or more new tables for question answering spanning across previous and the newly added tables without needing to remodel the conversational workspace, and gradually using or exposing only the portions of data that are required at particular steps without needing to remodel the conversational workspace. Also, some embodiments include a beneficial effect of suggesting a candidate schema of new tables can then be used to answer one or more new user queries.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   maintaining a context space for a natural language conversation of a user, wherein the context space comprises a dynamic set of one or more tables used for processing a first query of the natural language conversation;
   obtaining an additional table associated with a second query of the natural language conversation;
   discovering one or more implicit links between the additional table and the dynamic set of tables;
   updating the context space with the one or more implicit links and the additional table; and
   answering the second query based at least in part on the updated context space;
   wherein the method is carried out by at least one computing device.

2. The computer-implemented method of claim 1, wherein the answering comprises:
   determining that a third query of the natural language conversation cannot be answered using the updated context space;

identifying at least one entity in the third query that does not match information maintained in the context space;

determining a reference entity for the at least one entity in the third query; and generating a new table schema for answering the third query based at least in part on the at least one missing entity and the reference entity.

3. The computer-implemented method of claim 2, comprising:

generating a new table with the new table schema; and answering the third query based at least in part on the new table.

4. The computer-implemented method of claim 2, wherein determining the reference entity comprises:

identifying one or more candidate columns in the dynamic set of tables related to the at least one entity;

searching at least one external knowledge base of structured data to identify one or more classes of entities corresponding to values in each of the one or more candidate columns; and selecting one of the candidate columns as the reference entity based at least in part on a comparison of the identified one or more classes and the at least one entity.

5. The computer-implemented method of claim 2, wherein determining the reference entity comprises:

identifying the reference entity based at least in part on a neural network trained on a plurality of historical table schemas and a plurality of historical queries.

6. The computer-implemented method of claim 5, wherein the neural network comprises an attention-based permutation-invariant neural network.

7. The computer-implemented method of claim 1, wherein discovering the one or more implicit links between the additional table and the dynamic set of tables comprises:

determining a similarity score between columns of the additional table and columns of the dynamic set of tables based at least in part on one or more machine learning models.

8. The computer-implemented method of claim 7, wherein the one or more machine learning models comprise at least one of:

a bidirectional encoder representations from transformer module; and one or more rectified linear unit layers.

9. The computer-implemented method of claim 1, wherein discovering the one or more implicit links between the additional table and the dynamic set of tables comprises:

searching at least one external knowledge base of structured data to identify common entities of (i) at least one value in a column of the additional table and (ii) at least one value in a column of the dynamic set of tables.

10. The computer-implemented method of claim 1, wherein discovering the one or more implicit links between the additional table and the dynamic set of tables comprises:

searching at least a lexical database of semantic relations to identify common column names of at least one column of the additional table and at least one column of the dynamic set of tables.

11. The computer-implemented method of claim 1, wherein software is provided as a service in a cloud environment to perform at least a portion of the natural language conversation.

12. A computer program product comprising a computer readable storage medium having program instructions embodied therewith, the program instructions executable by a computing device to cause the computing device to:

maintain a context space for a natural language conversation of a user, wherein the context space comprises a dynamic set of one or more tables used for processing a first query of the natural language conversation;

obtain an additional table associated with a second query of the natural language conversation;

discover one or more implicit links between the additional table and the dynamic set of tables;

update the context space with the one or more implicit links and the additional table; and answer the second query based at least in part on the updated context space.

13. The computer program product of claim 12, wherein the answering comprises:

determining that the additional query cannot be answered using the updated context space;

identifying at least one entity in the additional query that does not match information maintained in the context space;

determining a reference entity for the at least one entity in the third query; and generating a new table schema for answering the third query based at least in part on the at least one missing entity and the reference entity.

14. The computer program product of claim 13, wherein the computing device is further caused to:

generate a new table with the new table schema; and answer the third query based at least in part on the new table.

15. The computer program product of claim 13, wherein determining the reference entity comprises:

identifying one or more candidate columns in the dynamic set of tables related to the at least one entity;

searching at least one external knowledge base of structured data to identify one or more classes of entities corresponding to values in each of the one or more candidate columns; and selecting one of the candidate columns as the reference entity based at least in part on a comparison of the identified one or more classes and the at least one entity.

16. The computer program product of claim 13, wherein determining the reference entity comprises:

identifying the reference entity based at least in part on a neural network trained on a plurality of historical table schemas and a plurality of historical queries.

17. The computer program product of claim 16, wherein the neural network comprises an attention-based permutation-invariant neural network.

18. The computer program product of claim 13, wherein discovering the one or more implicit links between the additional table and the dynamic set of tables comprises:

determining a similarity score between columns of the additional table and columns of the dynamic set of tables based at least in part on one or more machine learning models.

19. The computer program product of claim 18, wherein the one or more machine learning models comprise at least one of:

a bidirectional encoder representations from transformer module; and one or more rectified linear unit layers.

20. A system comprising:
a memory configured to store program instructions;
a processor operatively coupled to the memory to execute the program instructions to:
maintain a context space for a natural language conversation of a user, wherein the context space comprises a dynamic set of one or more tables used for processing a first query of the natural language conversation;
obtain an additional table associated with a second query of the natural language conversation;
discover one or more implicit links between the additional table and the dynamic set of tables;
update the context space with the one or more implicit links and the additional table; and answer the second query based at least in part on the updated context space.

* * * * *